United States Patent [19]
Tokunaga et al.

[11] Patent Number: 5,251,248
[45] Date of Patent: Oct. 5, 1993

[54] TELEPHONE NETWORK HAVING PERSONAL NUMBERS FOR POSITION-INDEPENDENT

[75] Inventors: Hiroshi Tokunaga, Iruma; Noriaki Yoshikawa, Kokubunji; Takeshi Hattori, Miura; Hidetsugu Kobayashi, Iruma; Yoshiyuki Yasuda, Yokohama; Tatsuo Nohara, Hachiooji, all of Japan

[73] Assignee: Nippon Telegraph and Telephone Corporation, Tokyo, Japan

[21] Appl. No.: 663,932
[22] PCT Filed: Jun. 28, 1990
[86] PCT No.: PCT/JP90/00839
  § 371 Date: Apr. 19, 1991
  § 102(e) Date: Apr. 19, 1991
[87] PCT Pub. No.: WO91/00664
  PCT Pub. Date: Jan. 10, 1991

[30] Foreign Application Priority Data

Jun. 30, 1989 [JP] Japan .................. 1-168725

[51] Int. Cl.[5] ......................... H04M 11/00
[52] U.S. Cl. ......................... 379/58; 379/62; 379/67; 379/112; 379/220; 379/242
[58] Field of Search .......... 379/58, 60, 62, 63, 379/67, 91, 142, 144, 216, 354, 355, 111, 112, 219, 220, 229, 242, 258, 308

[56] References Cited

U.S. PATENT DOCUMENTS

| 4,748,655 | 5/1988 | Thrower et al. | 379/60 |
| 4,759,056 | 7/1988 | Akiyama | 379/142 |
| 4,833,702 | 5/1989 | Shitara et al. | 379/60 |
| 4,860,336 | 8/1989 | D'Avello et al. | 379/91 |
| 4,951,308 | 8/1990 | Bishop et al. | 379/144 |
| 4,980,907 | 12/1990 | Raith et al. | 379/63 |
| 5,063,588 | 11/1991 | Patsioka | 379/58 |

FOREIGN PATENT DOCUMENTS 58-29669 6/1983 Japan .
59-21163 2/1984 Japan .

OTHER PUBLICATIONS

Telephony advertisement: "Cellular Option", Dec. 22, 1986, New Product and Services Section, p. 62.

Primary Examiner—Curtis Kuntz
Assistant Examiner—Dwayne D. Bost
Attorney, Agent, or Firm—Cushman, Darby & Cushman

[57] ABSTRACT

This invention allows a subscriber of a telephone network to receive a call by a telephone registered under his/her personal telephone number no matter where he/she carries the telephone with him/her by maintaining a reference table of a personal telephone number assigned to each subscriber, a station number assigned to each telephone, and a subscriber loop address assigned to a telephone connection terminal of the network in a memory within the network. The reference table collates the station number of the telephone registered in correspondence with a personal telephone number with the subscriber loop address at which the particular telephone is being connected, and when a call for connection is made under the personal telephone number, the connection is made to the telephone by referring to the reference table, calling the loop address at which the telephone registered under the personal telephone number is currently connected, and connecting the call under control to the telephone registered under the particular personal telephone number. The station numbers are allocated to telephones respectively in the order of manufacture or distribution in accordance with a certain rule to avoid duplication.

15 Claims, 7 Drawing Sheets

TELEPHONE NETWORK HAVING PERSONAL NUMBERS FOR POSITION-INDEPENDENT

BACKGROUND OF THE INVENTION

1. Field of the Invention

This invention is applicable to a public telephone network. This invention is applicable to communications by means of a telephone set which is handy, of pocket-size, and transportable when carried by a user. This invention more particularly is related to a communication system wherein a subscriber of a public telephone network carries with him/her a telephone when he/she travels, and when a call to the personal telephone number is generated in the network, connection is automatically made with the telephone set carried by him/her.

2. Description of the Prior Art

In the prior art public telephone network, a subscriber's line is wired from the subscriber's switch, and one subscriber number is usually assigned to a subscriber's line except for special cases. Calls for connection are made in the network by the number and controlled to be connected with the line thereof. The connection of calls made from inside of the telephone network and destined to the subscriber's line is made irrespective of the telephone type connected to the line so far as the telephone satisfies the standard conditions of the network.

There has been widely used a cordless telephone or an automobile telephone which can make or receive a call from an arbitrary location to or from a telephone within the public telecommunication network by means of a small, handy and movable telephone. The automobile telephone system using a relatively small portable type telephone has recently become popular.

There has been proposed a system wherein a user uses an IC card on which his/her telephone number and/or personal information are written in, and when the user inserts the card at a terminal within a public telecommunication network, he/she can use the terminal as the personal telephone.

In Germany, a service has already been put into practice which connects a call from a small movable telephone via an automobile station when an ID card is mounted on the telephone.

In the personal communication system where users are individuals, it is ideal that an individual user is assigned with a subscriber's number, and when a call for connection is made to the number, the connection is made with the person no matter where he/she is. The personal user herein means not only the person specified by personal name but a person specified by the business section of an organization.

The above-mentioned cordless or automobile telephone has satisfied conditions for the optimal modes of such a dream telephone to a certain extent. However, no matter how conveniently portable the cordless telephones are, their use is limited principally within a building due to the limitation of received power, and cannot be extended beyond such an area. Automobile telephones including those designed as portable inevitably require much power in transmission as the scope of coverage by a base station is designed to be wide. It therefore needs a large and heavy battery, making the telephone bulky in size and inconvenient. As available radio frequencies are limited, all the connections requested by personal subscribers (on the order of several millions) cannot be accommodated within a public telephone network. As the human living environment becomes increasingly diverse, the network should be extended to inside of buildings, basements, or construction sites where radio waves cannot easily reach. It would be impossible to build such an extensive system only with radio waves.

Telephone sets are indispensable tools we use in everyday life in modern society, and we are particular about their color, design, form, performance and price. We want to have a wide choice when purchasing them. Some wish to change their telephone sets by the season or by their preference occasionally. Some even wish to use different sets daily. Telephone sets might sometimes be gift items. Some exchange their sets with friends.

Telephone manufacturers hope to design and manufacture various types of telephone sets to meet such diversified demands of users and to sell newly designed sets which go with the mode of fashion. They also want to introduce advanced technology in their products.

Reflecting such trends, various types of telephone sets are currently available at retail electric appliance shops or big department stores. In the days when one subscriber's number corresponded to one subscriber's line in a one-to-one relationship, a user bought a telephone and simply connected it to the terminal of his/her subscriber's line. However, as we can travel with our personal telephones nowadays, if subscribers are given different numbers whenever they purchase or change their telephone set, it would be extremely troublesome as they must provide their new numbers to their friends or business acquaintances. If we change telephone sets without changing the subscriber's number just like the prior art automobile telephone, we would have to bring the new set to a central telephone office for setting a new number for it every time we get a new one, causing great trouble.

BRIEF SUMMARY OF THE INVENTION

This invention was conceived to eliminate such inconveniences encountered in the prior art, and aims at providing a personal communication system wherein:

(1) a subscriber (an individual person or an organization) is assigned a personal telephone number by the public telephone network company:

(2) the subscriber does not change his/her personal telephone number permanently:

(3) the user can travel carrying with him/her the telephone set:

(4) regardless of the location the user happens to be in the network, he/she can receive a call through his/her telephone set whenever his/her personal telephone number is called:

(5) the telephone sets are available freely on the market:

(6) the telephone sets can be set with the user's personal telephone number by a simple manipulation after purchase:

(7) the charge for calls can be paid by originating a call from the user's personal telephone number.

(8) the telephone network is compatible with the public telephone networks currently in use:

(9) the network can efficiently utilize radio waves; and

(10) the telephone can be used in a basement or a construction site where conventional radio wave are not easily accessible.

This invention relates to a personal telephone system of a network wherein a subscriber is assigned a personal telephone number, a telephone set is recorded with a station number in a mode readable as signals, and a subscriber loop of the network (including a subscriber loop with radio waves) or a terminal station connected thereto is assigned a subscriber loop address, which is characterized by the structure comprising a memory circuit which holds a reference table which has been written in with the personal telephone numbers, the station numbers the telephones registered by the subscribers, and the subscriber loop addresses at which the registered telephones are currently connected, a connection control means which connects a call made by a personal telephone number, if it is made, at the subscriber loop address currently connected by searching the reference table, and a registration means which writes in or modifies said reference table.

More particularly, a telephone company which operates the telephone network assigns a subscriber who may be either a person or an organization a personal telephone number. This is similar to the telephone number we have been familiar with. The person or the member of an organization obtains a telephone set which is compatible with the standard of the network on the market. The telephone set he/she purchased is given a station number in advance in accordance with a certain rule. The number may be a manufacture number including an identification number of the manufacturer classified by the higher digits to prevent duplication. The station number may not be visible but may be read out in the form of signals by accessing the telephone from the network when the telephone is connected thereto. Connection terminals are provided at the end of a subscriber loop in the network. The terminal is also assigned a subscriber loop address. The address is similar to the personal telephone number or the subscriber loop address assigned to the subscriber lines of the conventional telephone network.

This invention is most remarkably characterized by the memory circuit which holds a reference table of the station number of each telephone set registered by a subscriber in correspondence with the personal telephone number and the subscriber loop address to which the registered telephone set is currently connected. When a call for connection is made by the personal telephone number, the system searches the table and connects the call to the subscriber loop address to which the telephone set of the called personal telephone number is currently connected. The system is further provided with a registration means which can write in or modify the reference table.

A call is made by a personal telephone number, and when the personal telephone number is collated once with a subscriber loop address at the current location, then the connection is controlled thereafter by the subscriber loop address. Collation with the station number is therefore not always necessary. But if the telephone used is not a telephone connected by wires but a movable radio telephone, the station number of the movable radio telephone is preferably referred to every time a call is made in order to prevent connection errors. In order to examine if a call is connected to an appropriate telephone after completion of a call connection, the station number of the telephone which is being connected to the subscriber loop address may be read out for collation with said reference table.

Telephone sets herein mean ordinary telephones as well as telephones including terminals equipped with such other functions as facsimile communication, connection to a computer network and, image communication.

The station number recorded in a telephone set is fixedly recorded in the particular telephone either in the process of manufacture or distribution and will not be changed principally during the life of the telephone. A station number comprises a considerable number of digits. The higher order digits may be allocated for identification of the manufacturer, and the lower order digits for that of the production run. The number is preferably set in a ROM installed in the telephone set.

A personal telephone number is assigned to a subscriber who is either a person or an organization, and is preferably the same as the subscriber loop address at his/her home position (such as his/her residence or main office). This is extremely convenient if we consider the compatibility of this personal communication system with the conventional public telephone network which does not differentiate the subscriber numbers from subscriber loop addresses. The registration means which writes in or modifies the reference table of the memory provided within the network includes a means which is actuated when a special number allocated for registration is called from a telephone set connected to an arbitrary subscriber loop address to read the station number recorded in the telephone set connected to the terminal and a means which collates the station number read by said means with a personal telephone number to be registered and records the same on said reference table.

The personal telephone number to be registered may be the subscriber loop address of the terminal connected to the telephone from which a special registration number is being called or a number which is separately inputted by a dialing operation from a telephone with the special registration number.

The registration means is actuated when a special number for setting a new position is called from the telephone connected to a connection terminal the system, reads out the station number from the record stored in the telephone connected thereto, and then records the subscriber loop address as the new location of the subscriber on the reference table in correspondence with the personal telephone number corresponding to the read out station number. The special number for setting a new position may be the same number as the special number for registration mentioned above.

The reference table may be written in with a secret ID number applied separately by a subscriber in correspondence with the subscriber number. As not necessarily all the subscribers make bona fide calls in practice, secret identification numbers may be needed in order to avoid unpermitted use of another subscriber's number. More particularly, the registration means is preferably adapted to permit alteration of a number on the reference table only when the secret identification number corresponding to the personal telephone number is inputted from a telephone even if an application for such alteration is made.

The registration means for writing or modifying the reference table is preferably operated from a special operation terminal within the telephone network — for instance, from a keyboard at the counter of the telephone company which administers the network.

It is preferable that the registration or alteration of secret identification numbers can be made only from the special keyboard.

As the history of calls is recorded for each personal telephone number, the calls are charged to the personal number.

The second aspect of this invention concerns a telephone set to be used for said personal communication system. More particularly, this invention aims to provide a telephone set comprising a connection means for the connection to a public telephone network, a means to transmit hook operation signals and dial operation signals to the network, a means to generate a ringing tone when it is called from the network, and a means to receive/transmit speech signals to/from the network, which is characterized in that the telephone set is provided further with a memory for station numbers which stores the station number unique to the particular telephone set, and a means which reads out a station number from the memory in accordance with a control signal coming from the network via said connection means and transmits the number as signals to the network via the connection means. Said means connecting to the public telephone network is usually a means connecting to wired subscriber's line but may be connected therewith by radio waves.

It is convenient if the telephone set is made in the form of an extension or a branch unit of a cordless telephone. In that case, the telephone according to this invention comprises a means to set a radio communication path with a host telephone of the cordless telephone, a means to transmit hook operation and dial operation signals via the radio path, and a means to transmit/receive speech signals to and from said host telephone via the radio path is characterized in that the system is further provided with a means which connects the telephone to a public telephone network with wires, a means to transmit hook operation and dial operation signals via the connection means, a means which generates a ringing tone when it is called from the network via the connection means, a means to transmit/receive speech signals to and from the network via the connection means, a memory for station numbers which is used to store the station number unique to the particular telephone, and a means which reads out the station number from the memory in accordance with the control signal coming from the network via said connection means and transmits the station number thereto via the connection means.

Although not directly related to the technical aspect of this invention, the contract and procedure to conclude the contract will be described below from the standpoint of a user in order to facilitate understanding of the personal communication system of this invention. When one wants to use a telephone system, he/she enters a contract with a communication company which operates the public telephone network and becomes a subscriber of the system as he/she is assigned a personal telephone number from the company in accordance with the contract. If the subscriber wants, according to the content of the contract, the company installs connection terminals for taking in the subscriber's line to his/her house or office and connecting a telephone. If the contract permits, the company may position the connection terminal inside an automobile owned by the subscriber instead of a fixed location such as his/her office or house. Depending on the content of the contract, the company does not necessarily have to lead in the subscriber's line at his/her house or office or install such a connection terminal. The subscriber may enter into a contract which provides him/her use of the network by a telephone equipped with functions for connection only with wire to the network or a movable radio telephone equipped with a radio signal transmitter/receiver.

Users purchase telephone sets having functions they wish to have in the market such as an electric appliance store or a department store. After connecting the telephone at a terminal of the subscriber loop led in at their house or any other subscriber loop (or by actuating a movable radio telephone), a user first transmits in dial signals the special number allocated for registration. The special number may be transmitted by a dial operation but preferably is transmitted automatically. The registration means is actuated within the telephone network on receipt of the special number to automatically write in the personal telephone number and station number of the telephone in the aforementioned reference table. Once such a registration has been completed, the user may unplug the telephone set from the connection terminal, carry it with him/her, and use it by connecting the same at a terminal at any subscriber loop address to which he/she happens to be close. If a third party within the network generates a call for the personal telephone number, the call is directed to at the connection to which the user has connected his/her telephone set. The user may originate a call from the connection to which he/she has connected his/her telephone set. The call charge is charged for the personal telephone number under which the particular telephone has been registered. In the case where the telephone in question is a movable radio telephone equipped with a radio signal receiver/transmitter, it may be connected in a radio circuit with the telephone network by the radio signal receiver/transmitter within the telephone even if no appropriate connection terminal is available or the user is travelling.

In the personal communication system according to this invention, an individual (or an organizational) subscriber is given a personal telephone number which is rarely changed. An individual user (or a person in charge of a specified business of the organization) can move or travel carrying with him/her the telephone, and may receive a call by the telephone if a call is generated for the personal telephone number no matter where he/she is. A person (or an organization) can freely purchase a telephone set in the market, set his/her personal telephone number on the telephone by simple manipulation without the trouble to bring it to a telephone company, receive a call from the telephone network by the personal telephone number or originate a call from the number, and pay the call charge by the number.

In the personal communication system according to this invention, a user may have plural personal telephone numbers. This is most convenient when one wishes to differentiate a private number from professional number. Similarly, an organization may have plural personal telephone numbers. The number of telephone sets the person or the organization has may be only one even if he/she has been given plural personal telephone numbers.

In the personal communication system according to this invention, if a registered telephone is in transit and is not possibly connected to the network, or if so instructed from the registered telephone, the communication company may provide answering services such as conveying recorded message to the caller or recording the message from the caller. The former message may be recorded by the subscriber. It is preferable to store the record of such answering services in said reference table. If the telephone registered for the personal telephone number is connected to the network and the reference table is accessed, the network automatically tells the subscriber by issuing a message that an answering service has been provided, and he/she may access the record if necessary.

The personal communication system according to this invention is compatible with telephone networks currently in use and may be installed therein. More particularly, it may be added to the telephone networks currently used. In other words, the personal communication system may be realized and developed by utilizing a large number of subscriber loops of wires, utilizing the automobile telephone or portable telephone, or using the cordless telephone currently in use without modification.

The personal communication system according to this invention does not require all of the subscribers who may be connected with wire to be newly connected with radio waves and thus promotes effective use of radio frequencies. Even if a subscriber wishes to have a radio link, if he/she is staying at a place such as his/her home or office, he/she can be connected with wire. The personal communication may be realized even within buildings, in basements or at construction sites where usually radio waves are not easily accessible by simply installing wire subscriber lines.

With the personal communication system according to this invention, telephone manufacturers may develop and freely sell telephones of new design or new functions. Users may be able to purchase or lease any telephone they prefer and use under a fixed personal telephone number. They may change telephone sets as frequently as they chooses.

If a telephone is designed as a branch unit of a cordless telephone, it may be connected to any cordless telephone at locations to which the telephone has been carried.

In the Figures, letters and numerals denote as the following features.

PS . . . a telephone set for the personal communication system,
TE . . . an ordinary telephone set,
CPS . . . a branch telephone unit of a cordless telephone,
CS . . . a host telephone unit of a cordless telephone,
NT . . . an adapter,                                    PBS . . . a personal base station,
$LS_1$, $LS_2$ . . . subscriber switches,
$TS_1$, $TS_2$ . . . toll switches,                     MS . . . an automobile station,
BS . . . a radio base station,                          MSC . . . an automobile switch,
CC . . . a controller,                                  M . . . a memory,
1 . . . a terminal,
2 . . . a memory for station number,
3 . . . a hook switch,                                  4 . . . a microprocessor,
5 . . . a push button dial,                             6 . . . a tone detector,
7 . . . a ringing tone generator,
8 . . . a multi-frequency signal generator,
11 . . . a hand set,
12 . . . a digital/analog converter,
13 . . . a modulator/demodulator device,
14 . . . a radio signal transceiver,
15 . . . a radio parameter memory,
21 . . . an analog/digital changeover switch,
27 . . . a subscriber loop connection detector.

DETAILED DESCRIPTION OF THE PRESENTLY PREFERRED EMBODIMENT

Figure 1:
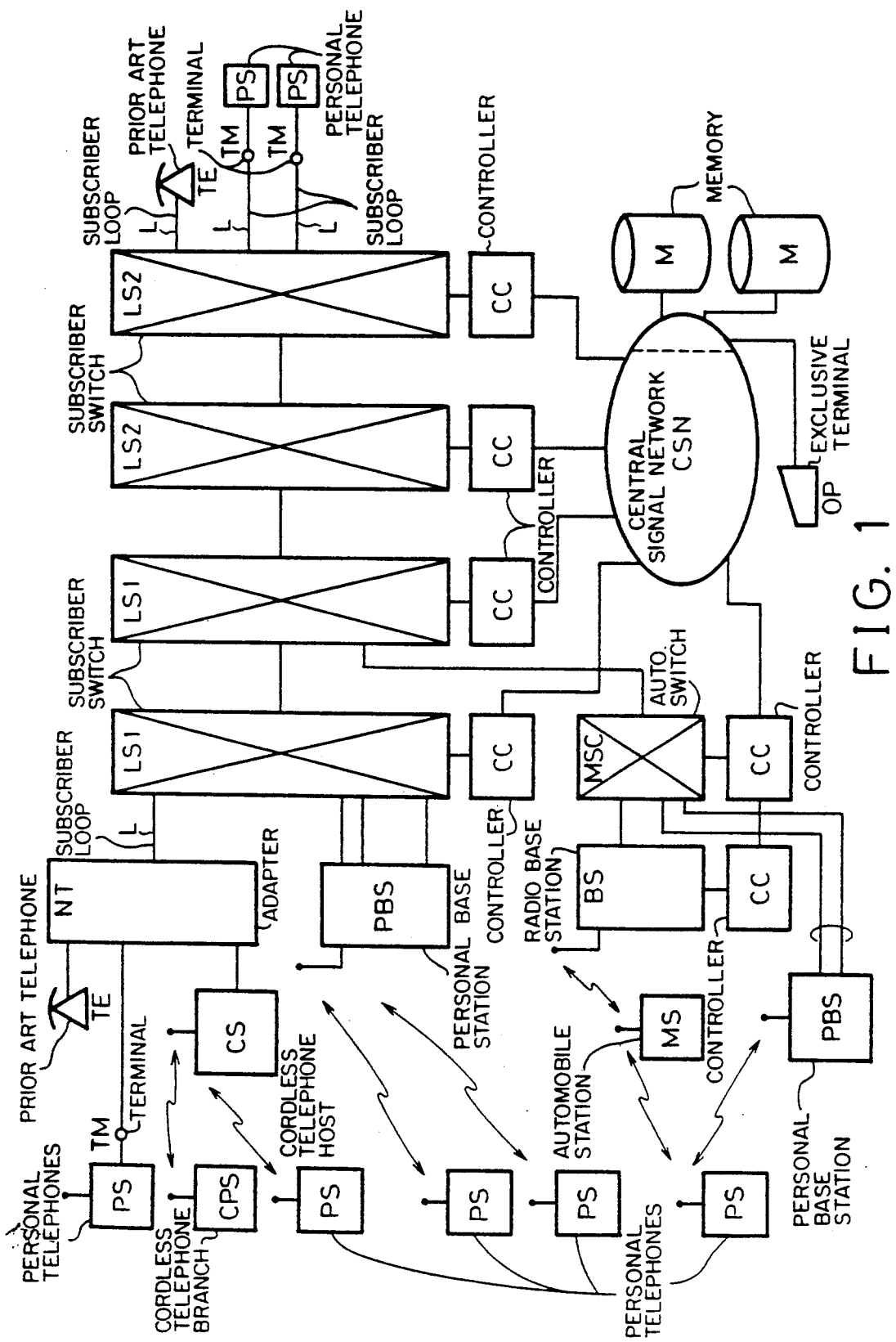
FIG. 1 is a block diagram showing an embodiment of the personal communication system according to this invention.

FIG. 1 is a block diagram showing an embodiment of the personal communication system according to this invention. The block diagram schematically depicts a public telephone network for explaining the system. An individual or an organization becomes a subscriber of the network when he/she or it is assigned a personal telephone number from a communication company which operates and manages the network. Telephone sets PS for the personal communication system are available on the market and assigned with station numbers in a mode readable as signals according to a certain rule so as to avoid duplication. A subscriber loop L of the public telephone network is provided with a terminal TM for connecting a telephone PS for personal communication. Subscriber loops are assigned loop addresses respectively. This number is similar to the subscriber's number or the loop number of the conventional public telephone network.

These terminals TM and ordinary telephone sets TE which have been installed are connected to subscriber switch $LS_1$ or $LS_2$ by either the subscriber loop L (right side) or by the subscriber loop L via an adapter NT (left side). There are many switches other than those depicted in the diagram which are similar to $LS_1$ or $LS_2$, and they are connected to each other by toll switches $TS_1$ and $TS_2$. Each switch is connected to a controller for known switching control.

As shown in the left side of FIG. 1, a telephone set PS for this invention personal communication may be connected to a terminal TM with cord, a telephone including radio circuit may be connected to a host telephone CS unit of a cordless telephone and to a base station for personal communication of the communication company with a radio circuit or may be connected to an automobile station MS of the automobile telephone. The automobile station MS is connected to a radio base station with radio circuit while the radio base station is connected to a toll switch $TS_1$ by the automobile switch MSC.

Controllers CC for respective switches are connected to a central signal network CSN to transmit/receive signals necessary for control. This invention is characterized most remarkably by the memory M within the network CNS which holds a reference table of the station number of a telephone set registered by the subscriber and the subscriber loop address at which the registered telephone is being connected in correspondence with the personal telephone number. According to this system, if a call is generated within the network by a personal telephone number, the subscriber loop address at which the telephone registered under the personal telephone number is searched by referring to the table stored in the memory M so that the call is connected to the loop under control. The means for controlling such a connection is included within the common signal network CSN and controllers CC of the switches. A registration means RW which writes in or modifies the table is provided at the connection of the memory M with the network CSN.

Although telephone sets for personal communication are all denoted in FIG. 1 with the letters PS, they include those equipped as means for connection via a radio link, those connectable with wire circuit, or those connectable either with wire or radio circuit. Further, they include not only the device conventionally known as a telephone but also any device equipped with functions for facsimile or digital data transmission/reception.

The station number of a telephone set PS is given permanently either in the process of manufacture or of distribution. A personal telephone number is principally the same as the subscriber loop address if the subscriber has a subscriber loop lead-in with a subscriber loop address at his/her home or its main office (home position).

The registration means RW is actuated when a special number allocated for registration is dialed from the telephone PS connected to the terminal TM to read the station number recorded in the telephone PS which is connected to the terminal, collate the read-out number with a personal telephone number to be registered and record it of the reference table of the memory M. The personal telephone number to be registered may be the subscriber loop address of the terminal TM which is connected to the telephone PS from which the special number for registration is dialed or the number separately inputted from the telephone PS.

The reference table also stores a secret ID number corresponding to the personal telephone number, and only when the personal telephone number is duly collated with the secret number inputted from the telephone PS is the table modified for registration.

The registration means RW is also actuated when a special number allocated for other positions (a number which is different from the special number for registration) is dialed from the telephone PS, and includes a means which reads the station number stored in the telephone connected to the terminal thereof to thereby store in said reference table the subscriber loop address at the connection terminal of the telephone in correspondence with the personal telephone number which in turn corresponds to the station number read by said means. If the scale of the system is relatively small, the special number for other positions may be the same as the special number for registration.

The other positions may be registered in different service classes by dialing of the subscriber: whether the user wishes to receive and generate calls at the position or whether the user wishes only to receive calls.

If an exclusive terminal OP is provided at a counter of the communication company, writing in or modification of said reference table may be made at this terminal. The memory M stores a history of connections in correspondence with a personal telephone number for charging. The connection history may be read out from the terminal OP as the information of charging.

Besides the information for charging, the memory M may be stored with such other information as temporary suspension of the use by the subscriber, history of changes in the personal telephone number, related personal telephone numbers (of the same organization or of the same family), and residential addresses.

FIG. 1 shows the telephone PS for this personal communication invention which may be connected not only to other telephones PS of the system but also to conventional ordinary telephones TE or various terminals which have already been connected to the public telephone network. The personal base stations PBS may be installed strategically at railroad stations, buildings, in downtown streets and other places where people gather or at construction sites. The base station PBS is connected via radio circuit to the telephones PS for forming radio channels, control of call connection with telephone PS or switching of station numbers for registration.

Figure 2:
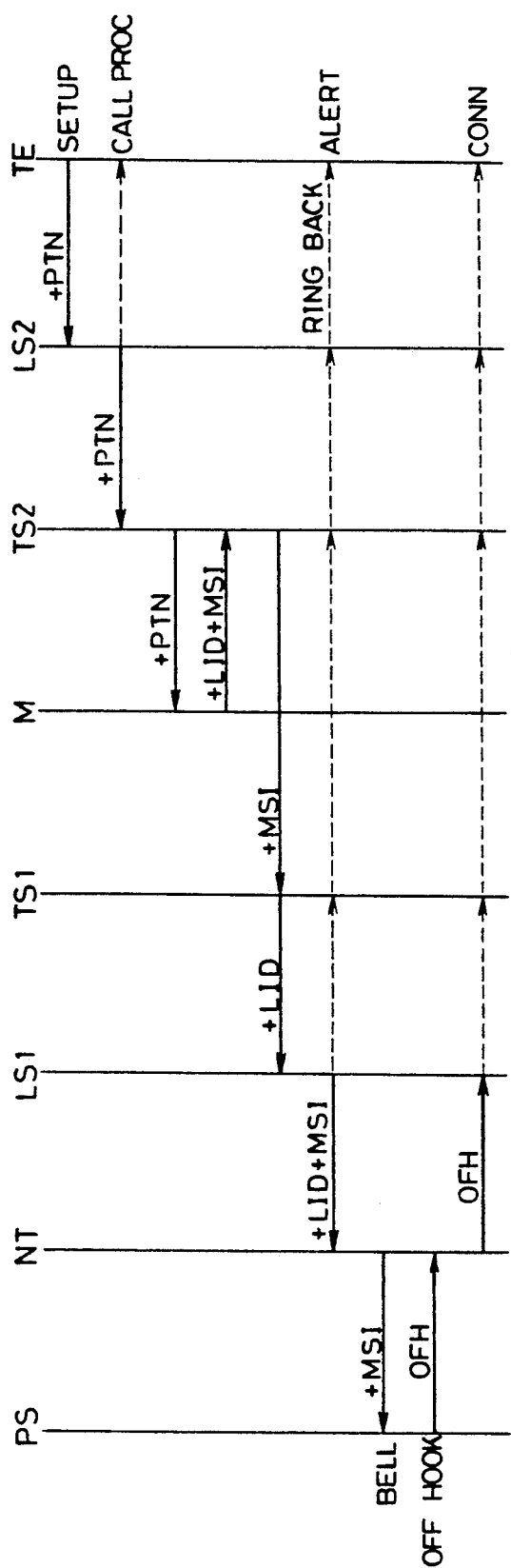
FIG. 2 is a chart showing the procedure when a call is received by a telephone in the personal communication system.

FIG. 2 shows schematically the procedure of a call which is originated from an ordinary telephone TE and received by a telephone PS of this personal communication system. A personal telephone number PTN is transmitted from the ordinary telephone TE by dialing. The call is received by a subscriber switch $LS_2$ which in turn issues an off-hook signal. The personal telephone number of the system starts with 050 in the first three digits, for example. When the personal telephone number is identified by the toll switch $TS_2$ as a subscriber of the system, the memory M is accessed via the switch $TS_2$. The memory M contains a reference table for the subscribers so that the subscriber loop address LID at the terminal to which the personal telephone number should be connected is read out. With the loop address LID, the connection is controlled and a call request is sent from the adapter NT to the telephone PS via the toll switch $TS_1$ and the subscriber switch $LS_1$. The telephone PS rings a bell and a ring-back tone is sent from the subscriber switch $LS_2$ to the telephone TE. When the telephone PS is in an off-hook condition, the off-hook signal OFH is returned to the subscriber switch $LS_1$ to form a loop among the toll switches $TS_1$ and TS$_2$ and subscriber switch LS$_2$ by a known technique.

Figure 3:
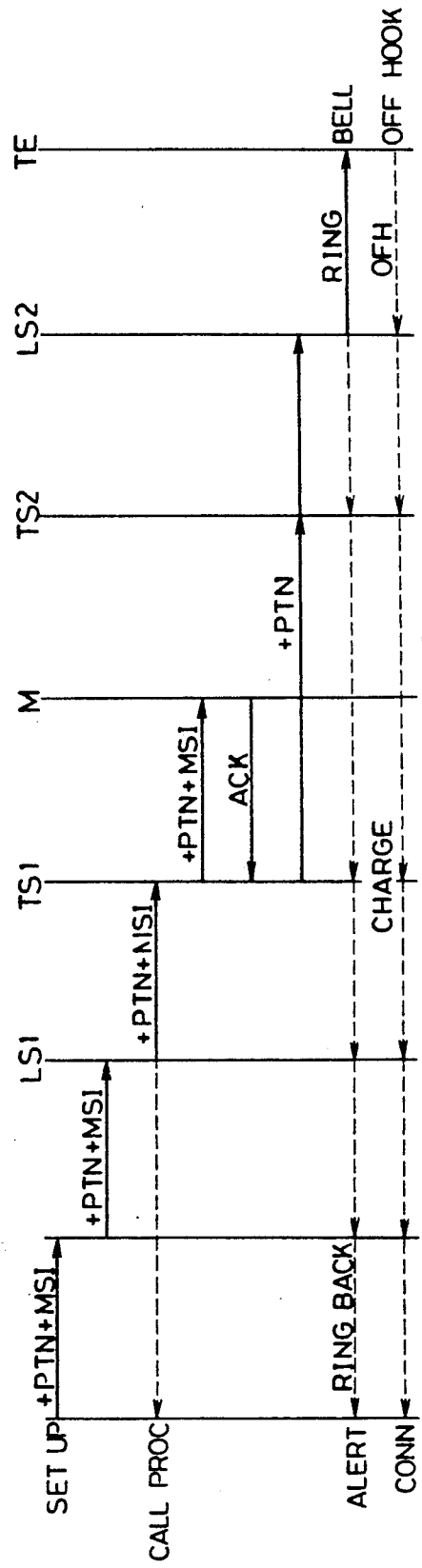
FIG. 3 is a chart showing the procedure when a call is originated from a telephone within the personal communication system.

FIG. 3 shows an example of the connection procedure when a call is originated from a telephone PS of the personal communication system and is connected to an ordinary telephone TE. When the telephone PS is set and a number is dialed, the personal telephone number PTN and a station number MSI of the telephone PS are transmitted to a subscriber switch LS$_1$ via an adapter NT. When the subscriber switch LS$_1$ recognizes it as coming from the telephone PS of the personal communication system, it accesses the memory M via a toll switch TS$_1$ and the station number MSI of the telephone PS is set thereto in order to check the personal telephone number which is registered with the station number MSI for charging. When confirmed, confirmation information ACK is returned to the toll switch TS$_1$. The toll switch, on receipt of the confirmation information ACK, controls connection to the addressed personal telephone number PTN and reaches the subscriber switch LS$_2$ via the toll switch TS$_2$, and the subscriber switch LS$_2$ returns a ring-back signal to the telephone TE of said subscriber loop. The telephone TE starts ringing a bell and at the same time, a ring-back tone is sent back to the calling telephone PS. When the telephone TE is hooked off, the off-hook signal OFH is returned to the subscriber switch LS$_2$ and a loop is formed among the subscriber switch LS$_2$, toll switches TS$_2$ and TS$_1$ and subscriber switch LS$_1$. Simultaneously charge information starts being recorded in the memory M.

Figure 4:
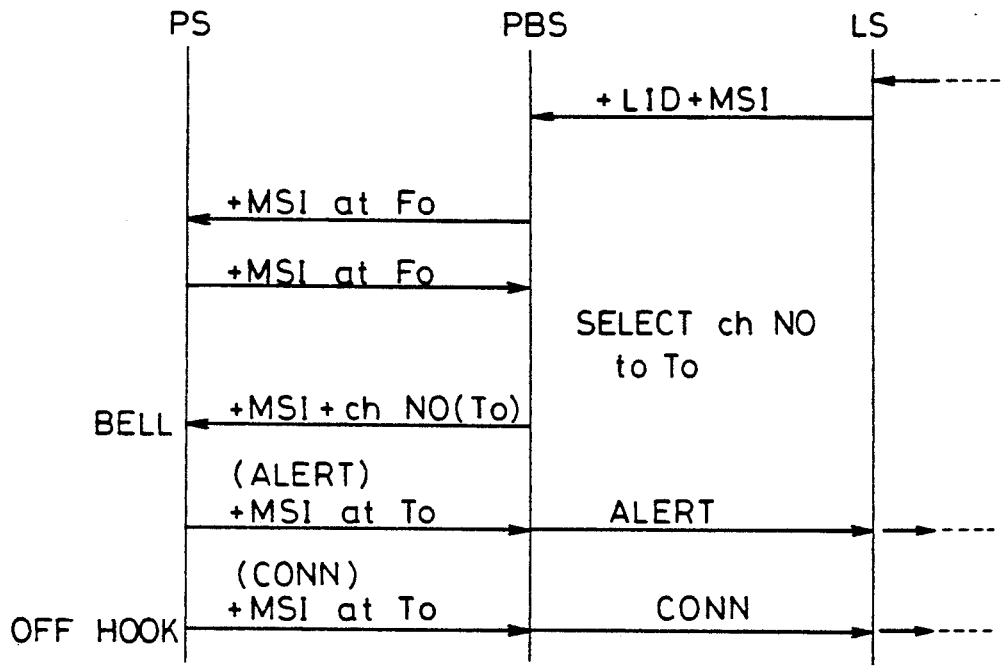
FIG. 4 is a chart showing the procedure when a call is received by a mobile radio telephone of the personal communication system.

FIG. 4 shows an example of the procedure when a call is made to a telephone PS which is a mobile radio telephone equipped with a radio signal transceiver. Similar to the case shown in FIG. 1, the memory M is accessed for referring to the table to read out a personal base station PBS which is connected to the addressed telephone PS. The subscriber switch LS is connected to a personal base station PBS by a number LID within the telephone network of the base station PBS. The personal base station PBS calls a telephone PS by using a channel F$_0$ which is a controlling channel as well as a stand-by channel, and when the telephone PS answers, a vacant channel is selected and designated as the speech channel (in this figure the channel T$_0$). This rings the bell of the telephone PS. The telephone PS transmits a confirmation message of the speech channel (CFMch), and an alert signal is sent back from the personal base station PBS to transmit a ring-back tone to a calling telephone. When the telephone is taken off hook, a speech loop is formed.

Figure 5:
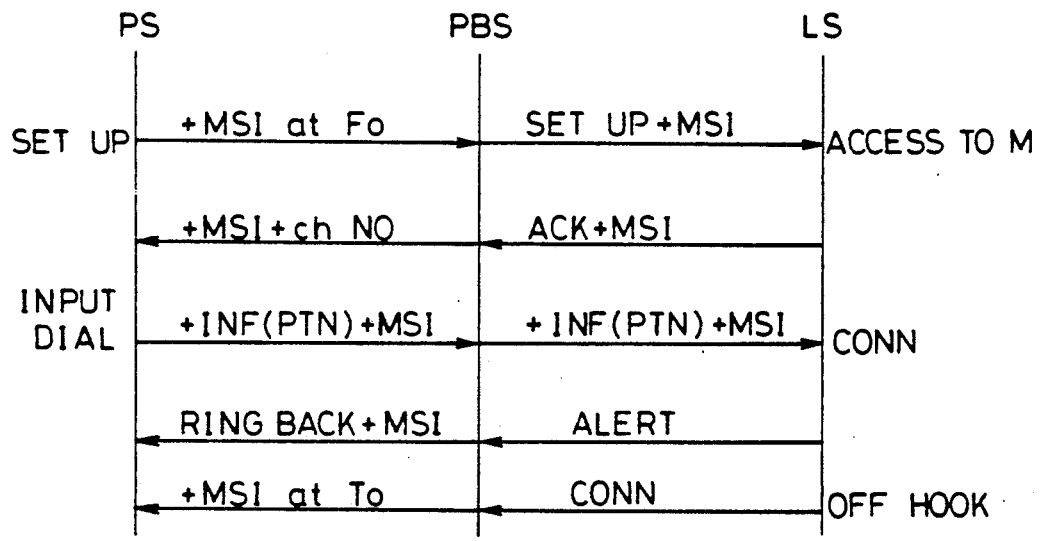
FIG. 5 is a chart showing the procedure when a call is originated from a mobile radio telephone of the personal communication system.

FIG. 5 shows an example of a procedure when a call is originated from the telephone PS which is also a mobile radio telephone for personal communication system. When the telephone PS is set up, the station number MSI of the telephone PS in the control channel F$_0$ is transmitted and an access is made to the memory M immediately via the subscriber switch LS. The station number MSI is collated with the personal telephone number PTN, and when it is confirmed as the telephone which has been registered by the subscriber, a confirmation information ACK is returned. With the information, the personal base station PBS designates a speech channel and transmits a dial tone. When an addressed personal telephone number (PTN) is dialed by the telephone PS, the number is connected under control. When an alert signal indicating that the connection has been made is sent back, a ring-back tone is returned to the telephone PS. When the addressed telephone is taken off hook and is ready to answer, a speech loop is formed.

This invention can be realized by a digital communication network such as ISDN (Integrated Services Digital Network). In that case, said adapter (NT) is replaced with network terminal devices. In such a case, plural personal mobile telephones PS may be connected to each subscriber loop.

Figure 6:
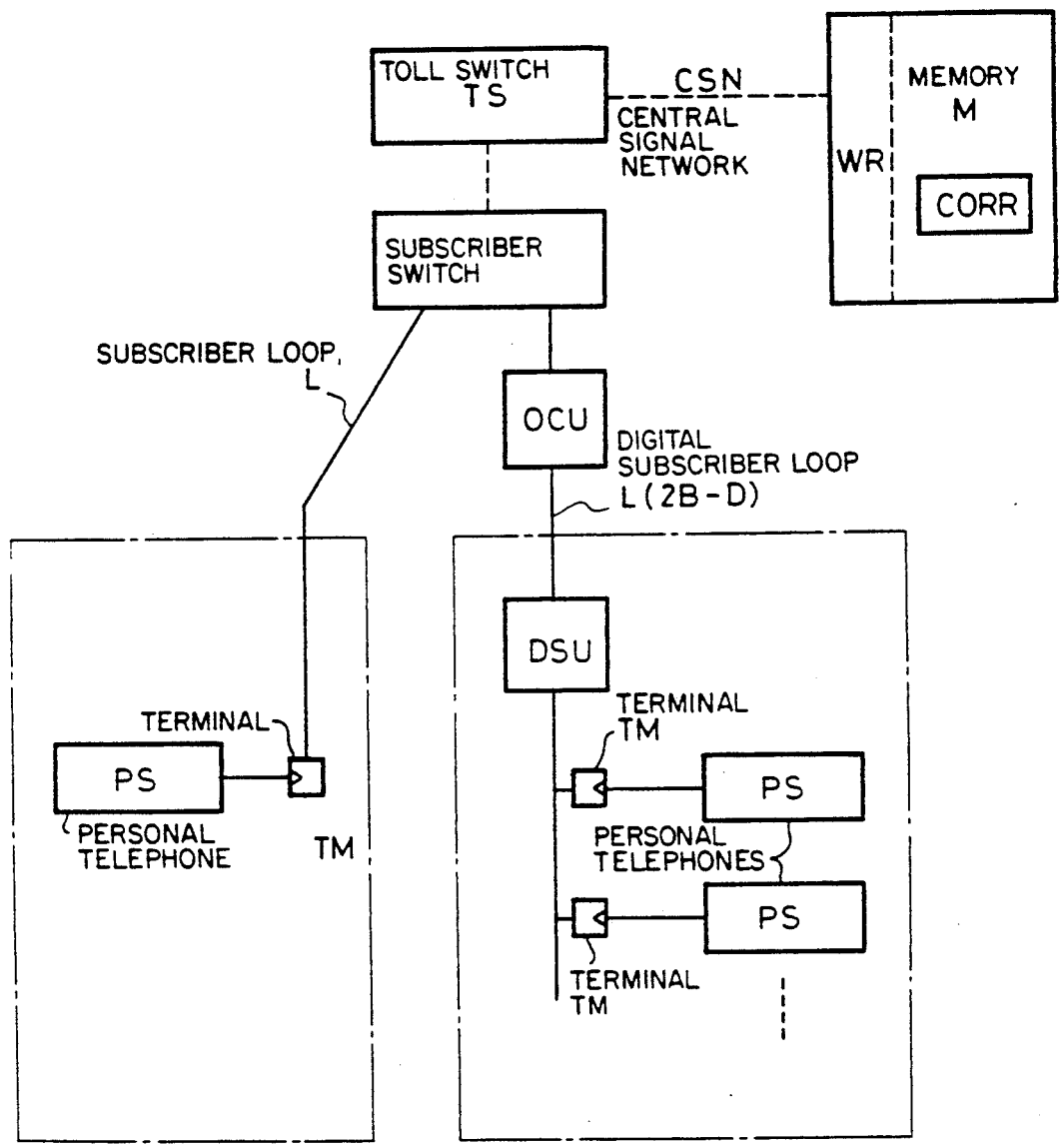
FIG. 6 is a block diagram showing an embodiment of the personal communication system.
Figure 7:
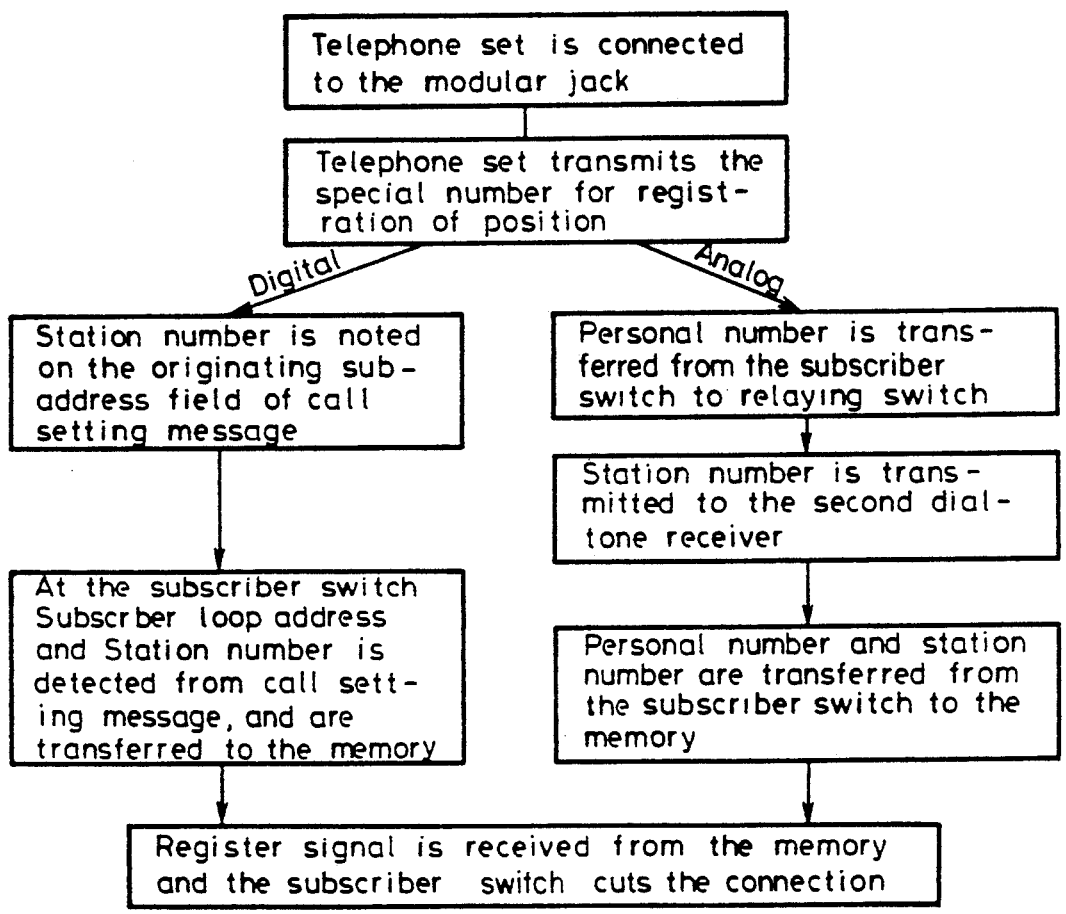
FIG. 7 is a flow chart of the switching control system when a new position is registered.

FIG. 6 shows an example of the connection mode of the system embodying this invention. FIG. 7 is a flow chart to show an example of the control procedure for registering positions other than the home position when a user carries with him/her a telephone for personal communication and travels. In this example, an analog subscriber loop L and digital subscriber loop L (2B+D) are provided in parallel, both of which are provided with connection terminals T for connecting to the telephone PS. Each subscriber loop L is connected to a telephone network via a toll switch TS to provide a gateway from a subscriber switch LS, and further to a memory M via a common signal network CSN, which is a remarkable feature of this invention. The memory M stores in the reference table the station numbers of telephones which are currently registered and subscriber loop numbers of the terminals at which the telephones are currently connected in correspondence with the personal telephone numbers.

In order to register a position where a user has traveled, he/she has to connect a portable telephone at a connection terminal of a subscriber loop at an arbitrary location. As the subscriber loop is provided with a plug socket, a telephone can be connected with the plug socket by using a short cable. When the device automatically detects the connection or when the user operates according to a certain simple procedure, a special number in the form of a dial signal is transmitted to register the new position.

When the telephone is to be connected with an analog subscriber line, the subscriber loop address is transferred from the subscriber switch LS to a toll switch TS, and after receiving the second dial tone from the toll switch, the telephone PS sends out its station number in the form of PB signals. The toll switch adds the station number to a subscriber loop address and transfers them to the registration means RW and the memory M. The memory M stores for registration the subscriber loop address of the terminal which is connected currently in terms of the station number in correspondence with the personal telephone number. Upon completion of registration, a tone signal (or voice message) is transmitted to terminate the operation.

When a telephone is connected to a digital subscriber loop, the telephone PS describes the station number in the originating sub-address data field of the call set message and transmits it (see CCITT Standard Q931). The toll switch TS reads out the subscriber loop address and station number out of the message and transfers the information to the registration means RW and the memory M. The memory M modifies the content of the record and relays the modification to the telephone PS after completing the registration.

The telephone set to be used in the personal communication system according to this invention will now be described. The telephone according to this invention is made in a form suitable and convenient for travelling and transportation. One typical shape of the telephone is that of a cordless telephone branch unit which is recently popularized. A handset with integrated receiver and transmitter is mounted with push buttons and several function buttons and contains a radio signal transceiver, a short antenna and a battery as a power source inside. The telephone of this personal communication system invention is preferably connected with a public telephone network either with cable or radio waves, and the casing of the telephone includes a connection terminal. With a short cable, the telephone may be connected to a terminal of the subscriber loop.

The telephone to be used for this invention system may be one having no connection means with radio waves to the public telephone network. The shape may be similar to that of a branch unit of a cordless telephone. In this case it is not equipped with a radio signal transceiver nor an antenna. The telephone without radio connection means may be connected to a terminal of a wired subscriber loop at a given position, and this type can be supplied at a low price in mass production.

Figure 8:
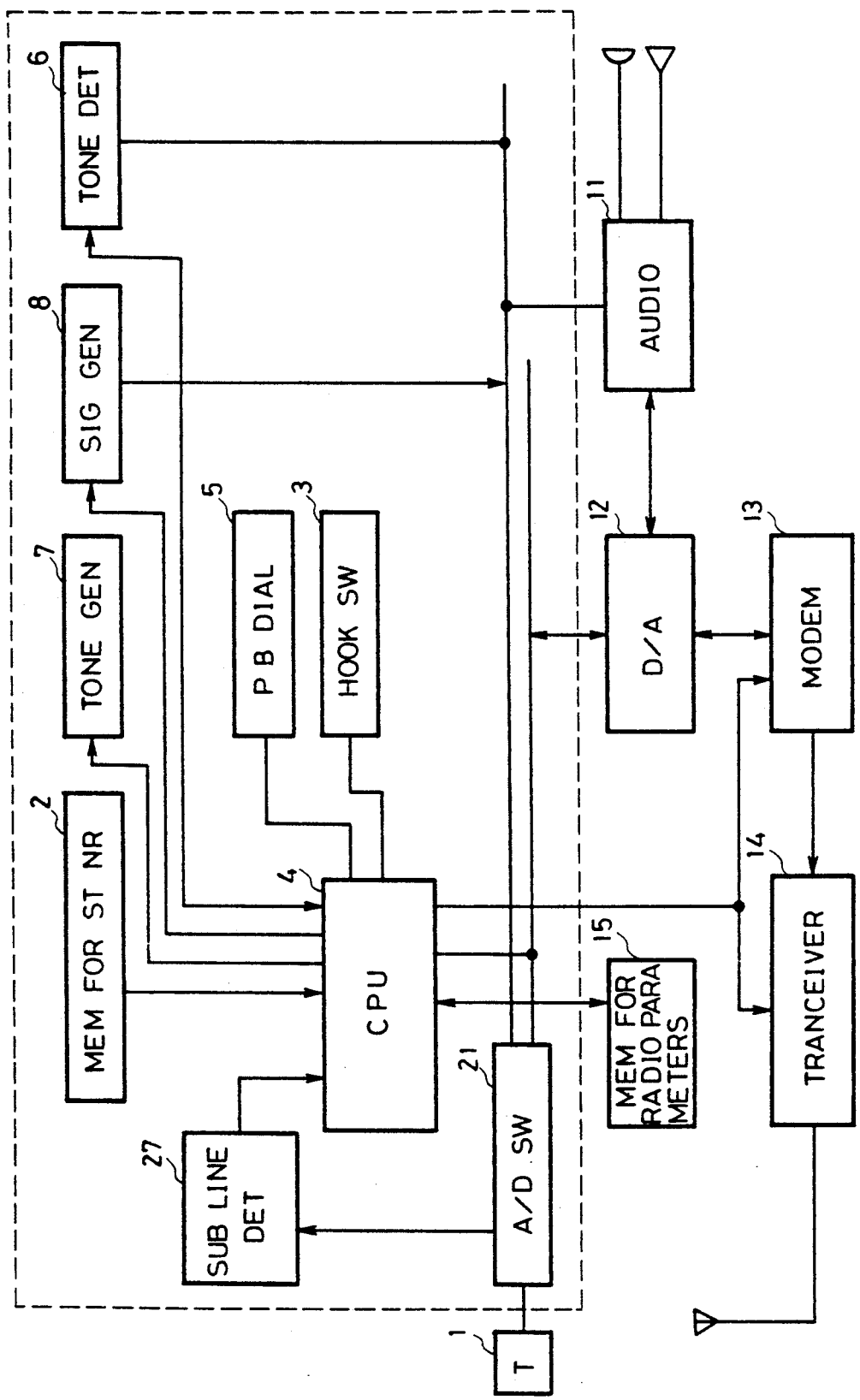
FIG. 8 is a block diagram showing a telephone of the personal communication system.

FIG. 8 is a block diagram to show a telephone for personal communication.

The telephone according to this invention includes a terminal 1 as a connection means with a public telephone network, and may be connected to a terminal 1 of the subscriber loop with a short cable. The telephone is provided with a hook switch 3 and a push button dial 5 for dial operation. The hook switch 3 and the push button dial 5 are connected to a microprocessor 4 which controls a multi-frequency signal generator 8 to transmit operation signals to the terminal 1. When a call is originated from the telephone network, a ringing tone is generated from a ringing tone generator 7. This telephone is provided with a station number memory 2 which stores the station number unique to the telephone and the microprocessor 4 having a means which reads out the station number from the memory in accordance with the control signal coming from the network via said terminal 1 and transmits the station number to the network.

This telephone has a radio signal transceiver 14 as a means to form the radio communication path, a modulator/demodulator 13 which gives the modulated signals to the transceiver and demodulates the received signal at the transceiver and a radio parameter memory 15 which stores the frequency at which radio connection is made.

This telephone is structured to be connected to either a digital subscriber loop or an analog subscriber loop. More specifically, the telephone includes an A/D changeover switch 21 which can set the connection either with an analog or a digital circuit, an analog bus 23 and a digital bus 25. The transceiver 11 comprises analog circuits and is connected to the analog bus 23 and at the same time is connected to said modulator/demodulator 13 via the D/A converter 12.

The subscriber loop connection detector 9 detects if the terminal 1 is inserted in a digital circuit and provides the result to the microprocessor 4. The tone detector 6 detects analog tone signals coming from the terminal 1 and provides the result to the microprocessor 4.

Figure 9:
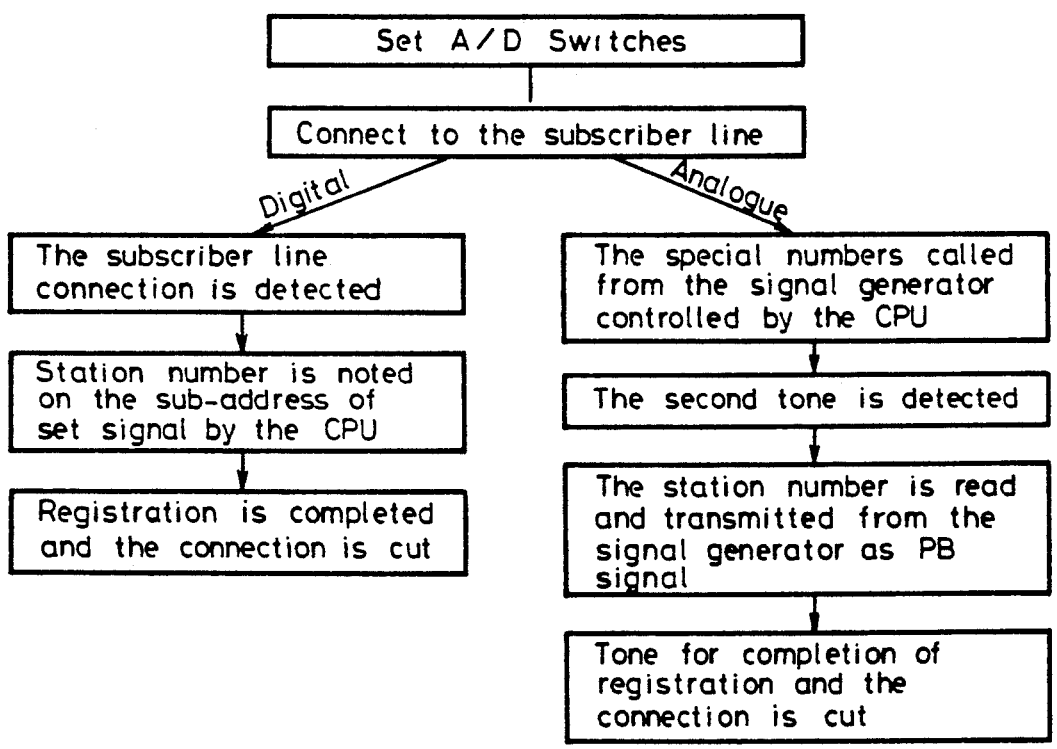
FIG. 9 is a flow chart of control when a new position is registered.

FIG. 9 is a flow chart to show the operation procedure when a position other than the home position is registered by the telephone connected to the subscriber loop. When the changeover switch 21 of the telephone is set in analog and the terminal 1 is connected to a terminal of the analog subscriber loop, the tone detector 6 detects the dial tone of the line to actuate the microprocessor 4. By the control of the microprocessor 4, a special number for accessing the registration means for modifying the content of the memory which stores the reference table is transmitted as PB signals from the generator 8. The second dial tone is sent back from the registration means to the subscriber loop connected thereto. The tone detector 6 detects it and sends out the detection output to the microprocessor 4. This makes the microprocessor 4 read out the station number stored in the memory 2, control the generator 8 and transmit the station number as PB signals to a subscriber loop. When a tone signal for completion of registration is sent from the subscriber line, the tone detector 6 detects it and provides it to the microprocessor 4 to terminate the call.

The operation when the telephone is connected to a digital subscriber loop will now be described. The digital circuit is formed when the telephone is set by the changeover switch 21, and the terminal 1 is inserted in a digital subscriber loop. The detector 27 detects the signal of the subscriber line and provides the result to the microprocessor 4 to actuate it. The microprocessor 4 sets a call by inserting the station number at the originating address information field of the call set signal. Upon receipt of the signal indicating completion of the registration, it terminates the call.

Among blocks shown in FIG. 8, those written outside the area defined by the dotted line are functional blocks. The units to be utilized when the telephone is connected with radio circuits are described in particular detail. The transceiver 11 uses connection circuits with analog bus 5 when it is connected to an analog circuit. The bus for connection to digital circuit is connected to a the digital bus 9 via the D/A converter 12. When the telephone is connected with a radio circuit, digital signals of the D/A converter 12 are connected to the radio signal transceiver 14 via the modulator/demodulator 13. The memory 15 for radio zone numbers stores the radio zone for the moveable radio telephone and control parameter for the channel.

If there are no cabled subscriber lines are available at the location the telephone is transported to, or no subscriber lines which are convenient for use with cable are available, the telephone can still be connected by radio waves to form a radio circuit so that its station number is transmitted from the radio circuit thus set to register the current position or the subscriber loop with the radio circuit in a memory.

What is claimed is:

1. A personal communication system wherein a subscriber is assigned a personal telephone number, a telephone is recorded with a station number in a mode readable as signals, a subscriber loop of the network is assigned a subscriber loop address and the subscriber loop or a terminal connected thereto is provided with a connection terminal for connection with said telephone, said system comprising:

a memory circuit which has a reference table of personal telephone numbers, station numbers registered under respective personal telephone numbers, and subscriber loop addresses at which the registered telephones are being connected stored therein, connection controller means for connecting a call with said currently connected subscriber loop address when a call for a personal telephone number is generated by referring to said table, reading means for reading out the station number of a telephone connected to the connection terminal of the subscriber loop address in accordance with the call and for collating the number with said reference table, said station number being recorded fixedly on the telephone either in the order of manufacture or distribution according to a certain rule in order to avoid duplication, and registration means for writing in or modifying said reference table.

2. The personal communication system as claimed in claim 1 wherein said telephone is a terminal device having other functions than a telephone call.

3. The personal communication system as claimed in claim 1 wherein the personal telephone number is the same as the subscriber loop address thereof at his/her home position.

4. The personal communication system as claimed in claim 1 wherein when the telephone is a movable radio telephone, said subscriber loop comprises radio circuits, and said subscriber loop address is the number for connecting the movable radio telephone within said public telephone system.

5. The personal communication system as claimed in claim 1 wherein said registration means includes a means which writes in or modifies said reference table by manipulation from a special keyboard.

6. The personal communication system as claimed in claim 1 wherein history of connections is recorded in correspondence with respective personal telephone numbers for charging.

7. The personal communication system as claimed in claim 1 wherein the subscriber is an individual person or an organization.

8. The personal communication system as claimed in claim 1 wherein said public telephone network is provided with a means which transmits a pre-recorded message when a call is generated to a personal telephone number but connection therewith is not made.

9. The personal communication system as claimed in claim 8 wherein the system includes a means which records speech of a caller following the transmission of said message, a means which records the recording by said means, a means which notifies the recording when the system is accessed from a telephone registered under said personal telephone number, and a means which reproduces the content of the recording and transmits it to the telephone.

10. The personal communication system as claimed in claim 1 wherein said registration means includes a means which is actuated when a special number allocated for registration is dialed from a telephone connected to said terminal and reads the station number recorded therein, and a means which records in said reference table the station number thus read out by said means in correspondence with an appropriate personal telephone number.

11. The personal communication system as claimed in claim 10 wherein said personal telephone number to be registered is the subscriber loop address of said connection terminal to which the telephone having the dialed special number is connected.

12. The personal communication system as claimed in claim 10 wherein said personal telephone number to be registered is the number which has been inputted from the telephone from which said special number is dialed.

13. The personal communication system as claimed in claim 10 wherein an ID number is recorded in said reference table in correspondence with the personal telephone number thereof, and said registration means actuates said recording means only when the number inputted from the telephone connected to said terminal is collated with the corresponding ID number in reference to said table.

14. The personal communication system as claimed in claim 10 wherein said registration means includes a means which is actuated when a special number allocated for specifying relocating subscriber service is dialed from a telephone connected to said terminal to read the station number recorded in the telephone, and a means which records the subscriber loop address of the terminal in said reference table in correspondence with the personal telephone number corresponding to thus read out station number by said means.

15. The personal communication system as claimed in claim 14 wherein the special number allocated for specifying relocating subscriber service is the same number as the special number for registration.

* * * * *